United States Patent
Lee et al.

(10) Patent No.: US 7,195,214 B2
(45) Date of Patent: Mar. 27, 2007

(54) STAND FOR DISPLAY

(75) Inventors: You-Sub Lee, Kunpo (KR); Sang-hyun Han, Suwon (KR); Sang-hak Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/694,041

(22) Filed: Oct. 28, 2003

(65) Prior Publication Data

US 2004/0084579 A1    May 6, 2004

(30) Foreign Application Priority Data

Oct. 30, 2002    (KR)    .................... 10-2002-0066642

(51) Int. Cl.
*A47F 5/00*    (2006.01)

(52) U.S. Cl. .................. 248/125.8; 248/414; 248/919; 361/682

(58) Field of Classification Search ............ 248/125.8, 248/622, 469, 474, 122.1, 404, 414, 159, 248/917, 919, 418, 599, 600, 601, 631, 188.1, 248/188.7; 361/681, 682
See application file for complete search history.

(56) References Cited

U.S. PATENT DOCUMENTS

| | | | |
|---|---|---|---|
| 2,041,370 A * | 5/1936 | Pottorff ...................... 248/159 |
| 2,628,142 A * | 2/1953 | Dubach ....................... 248/413 |
| 2,890,010 A | 6/1959 | Barkheimer |
| 3,788,587 A | 1/1974 | Stemmler |
| 4,113,215 A | 9/1978 | Stapleton |
| 4,166,522 A | 9/1979 | Bourcier de Carbon |
| 4,235,405 A | 11/1980 | Carey |
| 4,329,800 A * | 5/1982 | Shuman .................... 40/606.14 |
| 4,339,104 A * | 7/1982 | Weidman ..................... 248/407 |
| 4,395,010 A * | 7/1983 | Helgeland et al. .......... 248/371 |
| 4,438,458 A | 3/1984 | Münscher |
| 4,447,031 A | 5/1984 | Souder, Jr. et al. |
| 4,601,246 A | 7/1986 | Damico |
| 4,669,694 A | 6/1987 | Malick |
| 4,690,362 A * | 9/1987 | Helgeland ................... 248/404 |

(Continued)

FOREIGN PATENT DOCUMENTS

CN    1031010 C    2/1996

(Continued)

OTHER PUBLICATIONS

U.S. Appl. No. 10/295,831, filed Nov. 18, 2002, Hyun-jun Jung et al., Samsung Electronics Co, LTD.

(Continued)

*Primary Examiner*—Anita M. King
(74) *Attorney, Agent, or Firm*—Staas & Halsey LLP

(57) ABSTRACT

A stand for a display having a base, a supporting case mounted on the base, a supporting member mounted inside the supporting case and having an end seated on the base to support the weight of the display, and a mounting bracket engaged with the the other end of the supporting member, to mount the display. This stand supports the weight of a large-sized display and allows a user to swivel the display around an axis of the supporting member, and change the distance between the base and the display.

44 Claims, 10 Drawing Sheets

U.S. PATENT DOCUMENTS

| | | | |
|---|---|---|---|
| 4,691,886 A | 9/1987 | Wendling et al. | |
| 4,729,533 A | 3/1988 | Hillary et al. | |
| D295,415 S | 4/1988 | Thies et al. | |
| 4,768,744 A | 9/1988 | Leeds et al. | |
| 4,777,750 A * | 10/1988 | Garfinkle | 40/607.04 |
| 4,834,329 A | 5/1989 | Delapp | |
| 4,846,434 A | 7/1989 | Krogsrud | |
| 4,859,092 A | 8/1989 | Makita | |
| 4,864,601 A | 9/1989 | Berry | |
| 4,924,931 A | 5/1990 | Miller | |
| D313,405 S | 1/1991 | Barry et al. | |
| 4,989,813 A | 2/1991 | Kim et al. | |
| 5,012,852 A * | 5/1991 | Blackhurst | 160/351 |
| 5,088,676 A | 2/1992 | Orchard et al. | |
| 5,102,084 A | 4/1992 | Park | |
| 5,107,402 A | 4/1992 | Malgouires | |
| 5,112,019 A | 5/1992 | Metzler et al. | |
| 5,144,290 A | 9/1992 | Honda et al. | |
| 5,163,652 A * | 11/1992 | King | 248/538 |
| 5,206,790 A | 4/1993 | Thomas et al. | |
| D337,104 S | 7/1993 | Orchard | |
| D349,489 S | 8/1994 | Wang | |
| 5,335,142 A | 8/1994 | Anderson | |
| 5,383,138 A | 1/1995 | Motoyama et al. | |
| 5,422,951 A | 6/1995 | Takahashi et al. | |
| 5,437,236 A | 8/1995 | Zeiner | |
| 5,751,548 A * | 5/1998 | Hall et al. | 361/686 |
| 5,758,849 A | 6/1998 | Bui et al. | |
| 5,771,152 A | 6/1998 | Crompton et al. | |
| 5,799,917 A | 9/1998 | Li | |
| 5,812,368 A | 9/1998 | Chen et al. | |
| 5,835,342 A | 11/1998 | Hunte | |
| 5,876,008 A | 3/1999 | Sweere et al. | |
| 5,911,523 A * | 6/1999 | Burchart | 40/406 |
| 5,924,665 A | 7/1999 | Sweere et al. | |
| 5,941,493 A | 8/1999 | Cheng | |
| 5,975,472 A | 11/1999 | Hung | |
| 5,992,809 A | 11/1999 | Sweere et al. | |
| 5,997,493 A | 12/1999 | Young | |
| 6,012,693 A | 1/2000 | Voeller et al. | |
| 6,015,120 A | 1/2000 | Sweere et al. | |
| 6,018,847 A | 2/2000 | Lu | |
| 6,031,714 A | 2/2000 | Ma | |
| 6,062,148 A | 5/2000 | Hodge et al. | |
| 6,064,373 A | 5/2000 | Ditzik | |
| 6,081,420 A | 6/2000 | Kim et al. | |
| 6,113,046 A | 9/2000 | Wang | |
| 6,116,690 A | 9/2000 | Larson | |
| 6,134,103 A | 10/2000 | Ghanma | |
| 6,164,611 A | 12/2000 | Kuhnke | |
| 6,168,124 B1 | 1/2001 | Matsuoka et al. | |
| 6,189,842 B1 * | 2/2001 | Bergeron Gull et al. | 248/125.1 |
| 6,189,849 B1 | 2/2001 | Sweere et al. | |
| 6,189,850 B1 | 2/2001 | Liao et al. | |
| 6,233,138 B1 | 5/2001 | Osgood | |
| 6,270,047 B1 | 8/2001 | Hudson | |
| 6,286,794 B1 | 9/2001 | Harbin | |
| 6,288,891 B1 | 9/2001 | Hasegawa et al. | |
| 6,305,659 B1 * | 10/2001 | Metelski | 248/519 |
| 6,326,955 B1 | 12/2001 | Ditzik | |
| 6,347,433 B1 | 2/2002 | Novin et al. | |
| 6,352,226 B1 | 3/2002 | Gordon | |
| 6,367,756 B1 | 4/2002 | Wang | |
| 6,381,125 B1 * | 4/2002 | Mizoguchi et al. | 361/682 |
| 6,390,433 B1 | 5/2002 | Kasa-Djukic | |
| 6,394,403 B1 | 5/2002 | Hung | |
| 6,397,761 B1 * | 6/2002 | Moore | 108/50.01 |
| 6,402,109 B1 | 6/2002 | Dittmer | |
| 6,409,134 B1 | 6/2002 | Oddsen, Jr. | |
| 6,430,038 B1 | 8/2002 | Helot et al. | |
| 6,478,275 B1 | 11/2002 | Huang | |
| 6,494,150 B1 | 12/2002 | Phoenix et al. | |
| 6,499,704 B2 * | 12/2002 | Oddsen, Jr. | 248/125.1 |
| 6,502,792 B1 | 1/2003 | Cho et al. | |
| 6,522,530 B2 | 2/2003 | Bang | |
| 6,585,201 B1 * | 7/2003 | Reed | 248/181.1 |
| 6,592,090 B1 | 7/2003 | Li | |
| 6,609,686 B2 | 8/2003 | Malizia | |
| 6,695,266 B1 | 2/2004 | Tsai | |
| 6,695,274 B1 | 2/2004 | Chiu | |
| 6,702,238 B1 * | 3/2004 | Wang | 248/125.8 |
| 6,708,940 B2 | 3/2004 | Ligertwood | |
| 6,712,321 B1 | 3/2004 | Su et al. | |
| D489,370 S | 5/2004 | Jobs et al. | |
| 6,766,994 B2 | 7/2004 | Serbinski et al. | |
| 6,769,657 B1 | 8/2004 | Huang | |
| 6,819,550 B2 | 11/2004 | Jobs et al. | |
| 6,822,857 B2 * | 11/2004 | Jung et al. | 361/681 |
| 6,672,533 B1 | 1/2005 | Lin | |
| 6,680,843 B2 | 1/2005 | Farrow et al. | |
| 6,837,469 B2 | 1/2005 | Wu et al. | |
| 6,857,610 B1 * | 2/2005 | Conner et al. | 248/284.1 |
| 6,889,958 B2 * | 5/2005 | Hoffend, Jr. | 254/276 |
| 2001/0017761 A1 | 8/2001 | Ditzik | |
| 2002/0011544 A1 | 1/2002 | Bosson | |
| 2002/0130981 A1 | 9/2002 | Ma et al. | |
| 2003/0075649 A1 * | 4/2003 | Jeong et al. | 248/157 |
| 2003/0075653 A1 | 4/2003 | Li | |
| 2003/0080949 A1 | 5/2003 | Ditsik | |
| 2003/0086240 A1 | 5/2003 | Jobs et al. | |
| 2003/0132360 A1 | 7/2003 | Ju | |
| 2003/0142474 A1 | 7/2003 | Karidis et al. | |
| 2004/0011932 A1 | 1/2004 | Duff | |
| 2004/0056161 A1 | 3/2004 | Ishizaki et al. | |
| 2004/0057197 A1 | 3/2004 | Hill et al. | |
| 2004/0084585 A1 | 5/2004 | Watanabe et al. | |
| 2004/0084588 A1 | 5/2004 | Liu et al. | |
| 2004/0118984 A1 | 6/2004 | Kim et al. | |

FOREIGN PATENT DOCUMENTS

| | | |
|---|---|---|
| CN | 2504675 | 8/2002 |
| DE | 2847135 | 5/1980 |
| DE | 39 43 137 A1 | 8/1991 |
| DE | 200 09 691 | 11/2000 |
| DE | 4214341 A1 | 7/2003 |
| EP | 0 046 225 | 2/1982 |
| EP | 244 566 | 11/1987 |
| EP | 631 174 B1 | 4/1998 |
| EP | 1085753 | 3/2001 |
| GB | 2 206 464 | 1/1989 |
| JP | 57-151990 | 9/1982 |
| JP | 61-99873 | 5/1986 |
| JP | 61-99874 | 5/1986 |
| JP | 61-196314 | 8/1986 |
| JP | 62-96681 | 5/1987 |
| JP | 62-96682 | 6/1987 |
| JP | 62-239677 | 10/1987 |
| JP | 1-273086 | 10/1989 |
| JP | 2-58783 | 4/1990 |
| JP | 2-215408 | 8/1990 |
| JP | 02-215408 | 8/1990 |
| JP | 03-2381 | 1/1991 |
| JP | 03-29800 | 3/1991 |
| JP | 3-29800 | 3/1991 |
| JP | 3-095586 | 4/1991 |
| JP | 3-113423 | 11/1991 |
| JP | 03-113423 | 11/1991 |
| JP | 3-114875 | 11/1991 |
| JP | 03-114875 | 11/1991 |
| JP | 4-15680 | 1/1992 |
| JP | 4-33073 | 3/1992 |
| JP | 04-33073 | 3/1992 |
| JP | 04-81182 | 3/1992 |

| | | |
|---|---|---|
| JP | 4-81182 | 3/1992 |
| JP | 4-107284 | 4/1992 |
| JP | 4-155375 | 5/1992 |
| JP | 4-198979 | 7/1992 |
| JP | 3-017022 | 9/1992 |
| JP | 4-132517 | 12/1992 |
| JP | 5-36523 | 2/1993 |
| JP | 5-097098 | 4/1993 |
| JP | 05-36423 | 5/1993 |
| JP | 5-36423 | 5/1993 |
| JP | 5-188865 | 7/1993 |
| JP | 05-66715 | 9/1993 |
| JP | 6-4778 | 1/1994 |
| JP | 64778 | 1/1994 |
| JP | 6-37912 | 2/1994 |
| JP | 6-21079 | 3/1994 |
| JP | 6-118880 | 4/1994 |
| JP | 6-37912 | 5/1994 |
| JP | 8-121009 | 5/1996 |
| JP | 8-234672 | 9/1996 |
| JP | 8-319753 | 12/1996 |
| JP | 10-126068 | 5/1998 |
| JP | 10-214034 | 8/1998 |
| JP | 10-228333 | 8/1998 |
| JP | 11-006520 | 1/1999 |
| JP | 11-095866 | 4/1999 |
| JP | 11-154460 | 6/1999 |
| JP | 11-214859 | 8/1999 |
| JP | 11-338576 | 12/1999 |
| JP | 2000-019981 | 1/2000 |
| JP | 2000-56695 | 2/2000 |
| JP | 3068198 | 2/2000 |
| JP | 2000-122561 | 4/2000 |
| JP | 2000-206893 | 7/2000 |
| JP | 2000-206901 | 7/2000 |
| JP | 2000-242363 | 9/2000 |
| JP | 3073553 | 9/2000 |
| JP | 2000267581 | 9/2000 |
| JP | 2001-50244 | 2/2001 |
| JP | 2001-142407 | 5/2001 |
| JP | 2001-202026 | 7/2001 |
| JP | 2001-241427 | 9/2001 |
| JP | 20026990 | 1/2002 |
| KR | 1989-3755 | 6/1989 |
| KR | 88-3444 | 10/1989 |
| KR | 1989-20328 | 10/1989 |
| KR | 1991-0009310 | 5/1991 |
| KR | 1997-63717 | 11/1997 |
| KR | 114350 | 11/1997 |
| KR | 1998-4698 | 3/1998 |
| KR | 1997-14267 | 9/1998 |
| KR | 163133 | 9/1998 |
| KR | 1998-54989 | 12/1998 |
| KR | 1999-0040596 | 6/1999 |
| KR | 1999-40596 | 6/1999 |
| KR | 1999-0073869 | 10/1999 |
| KR | 20-168389 | 11/1999 |
| KR | 2000-168389 | 11/1999 |
| KR | 2000-722 | 1/2000 |
| KR | 2000-725 | 1/2000 |
| KR | 2000-827 | 1/2000 |
| KR | 20-182808 | 3/2000 |
| KR | 20-184275 | 3/2000 |
| KR | 20-0191805 | 8/2000 |
| KR | 20-215332 | 12/2000 |
| KR | 2000-73608 | 12/2000 |
| KR | 10-0289438 | 2/2001 |
| KR | 2002-5136 | 2/2001 |
| KR | 20-227925 | 4/2001 |
| KR | 20-227953 | 4/2001 |
| KR | 2001-0035722 | 5/2001 |
| KR | 2001-35722 | 5/2001 |
| KR | 20-0227925 | 6/2001 |
| KR | 20-239991 | 7/2001 |
| KR | 2001-53963 | 7/2001 |
| KR | 2001-56960 | 7/2001 |
| KR | 2001-83865 | 9/2001 |
| KR | 20-251611 | 10/2001 |
| KR | 20-0253576 | 11/2001 |
| KR | 20-0256013 | 11/2001 |
| KR | 20-256809 | 11/2001 |
| KR | 20-259625 | 12/2001 |
| KR | 20002-5136 | 1/2002 |
| KR | 20-0178710 | 4/2002 |
| KR | 2002-0029616 | 4/2002 |
| KR | 20-279427 | 6/2002 |
| KR | 20-0279427 | 6/2002 |
| KR | 10-353035 | 9/2002 |
| KR | 20-295990 | 11/2002 |
| KR | 20-304340 | 2/2003 |
| KR | 2003-0058204 | 7/2003 |

OTHER PUBLICATIONS

U.S. Appl. No. 10/314,350, filed Dec. 1, 2002, Sang-kyeong Ha et al., Samsung Electronics Co. LTD.
U.S. Appl. No. 10/646,864, filed Apr. 1, 2003, You-Sik Hong et al., Samsung Electronics Co. LTD.
U.S. Appl. No. 10/671,605, filed Sep. 1, 2003, filed Jun-soo Jeong, Samsung Electronics Co. LTD.
U.S. Appl. No. 10/671,863, filed Sep. 1, 2003, Ju-hwan Kim et al., Samsung Electronics Co. LTD.
U.S. Appl. No. 10/694,029, filed Oct. 1, 2003, Nam-il Cho et al., Samsung Electronics Co. LTD.
U.S. Appl. No. 10/694,041, filed Oct. 1, 2003, You-Sub Lee et al., Samsung Electronics Co. LTD.
U.S. Appl. No. 10/705,770, filed Nov. 1, 2003, Ju-hwan Kim et al., Samsung Electronics Co. LTD.
U.S. Appl. No. 10/792,745, filed Mar. 1, 2004, filed Sang-kyeong Ha et al., Samsung Electronics Co. LTD.
U.S. Appl. No. 10/916,436, filed Aug. 12, 2004, Hyun-jun Jung et al., Samsung Electronics Co, LTD.
U.S. Appl. No. 10/916,447, filed Aug. 12, 2004, Hyun-jun Jung et al., Samsung Electronics Co, LTD.
U.S. Appl. No. 10/406,269, filed Apr. 4, 2003, You-sik Hong, et al., Samsung Electronics Co, LTD.
Vesa Mounting Interface Standard, Mar. 19, 2003, 2 pages, www.ergotron.com/2_Product_pages/FP_ARMS/VESA/fp_vesa.asp.
Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
Korean Office Action issued on Mar. 8, 2006 in Korean Patent Application No. 10-2002-0050351 which corresponds to co-pending U.S. Appl. No. 10/646,864.

* cited by examiner

STAND FOR DISPLAY

CROSS-REFERENCE TO RELATED APPLICATIONS

This application claims the benefit of Korean Patent Application No. 2002-66642, filed Oct. 30, 2002, in the Korean Intellectual Property Office, the disclosure of which is incorporated herein by reference.

BACKGROUND OF THE INVENTION

1. Field of the Invention

The present invention relates to a stand for supporting a display that allows the display to be swiveled and elevated, and more particularly, to a stand for large-sized displays such as an LCD (Liquid Crystal Display) or a PDP (Plasma Display Panel), etc.

2. Description of the Related Art

Conventionally, there has been a stand that allows a display to be swiveled. This kind of conventional stand has mainly been used in lightweight small-sized stands employed for notebook computers or desktop computers. Japanese Patent Laid-Open No. 10-126068 disclosed a stand allowing the display to be swiveled. However, this type of stand cannot support heavy, large-sized displays.

Korean Patent Laid-Open No. 1997-14267 disclosed a stand allowing the display to be swiveled and elevated by a powered driving gear with the use of a handle for adjusting left and right angles, and a handle for adjusting elevation. But, this type of stand requires separate devices such as a plurality of driving gears and rack gears, and also a chamber for receiving them, thus the supporting device is complicated in structure.

SUMMARY OF THE INVENTION

Accordingly, it is an aspect of the present invention to provide a stand for a display that is capable of supporting a display of substantial weight, and that allows the display to be swiveled and elevated, and additionally needs no separate device for swiveling and elevation change of the display.

Additional aspects and advantages of the invention will be set forth in part in the description which follows and, in part, will be obvious from the description, or may be learned by practice of the invention.

The foregoing and/or other aspects of the present invention are achieved by providing a stand having a base, a supporting case mounted on the base, a supporting member having first and second ends mounted inside the supporting case and having the second end seated on the base to bear the weight of the display, a rotating case that is rotatably combined with a first end of the supporting case, and a mounting bracket engaged with a first end of the rotating case, to engage the display.

According to one aspect, the base has a base plate with a seating part, the seating part having an engaging opening to engage the supporting case.

According to one aspect, the base plate of the base has an extending part extending from the base plate, to increase stability of the base, and a first cover and a second cover respectively disposed on opposite sides of the base plate.

According to one aspect, the supporting case has a supporting trunk part, which the supporting member passes through, and a supporting guide to guide the supporting member.

According to one aspect, the supporting case additionally has a supporting bracket with: a seating flange, on which the lower end of the supporting member is seated; a first engaging opening engaging the supporting trunk part of the supporting case; and a second engaging opening engaged with the seating part of the base. The supporting case also has first and second bracket covers covering portions of the supporting bracket, and the seating part of the base corresponds to the supporting bracket.

According to one aspect, the supporting trunk part has a pipe through which the supporting member passes.

According to one aspect, the supporting guide of the supporting case has a bent part extending from a guiding flange having a central bore, to guide the supporting member.

According to one aspect, the supporting member has a supporting shaft that passes through the supporting case, and a bracket-engaging part positioned on a first end of the supporting shaft, that engages the mounting bracket.

According to one aspect, the supporting member has a cylinder cover, a cylinder with a first end combined with the cylinder cover to translate along a common axis of the cylinder and the cylinder cover, and a cylinder part having a bracket-engaging part located on a second end of the cylinder.

According to one aspect, the mounting bracket has an engaging part with which the bracket-engaging part of the supporting member of the cylinder part is engaged, and an opening to which the display is mounted.

According to one aspect, the mounting bracket additionally has a cover.

According to one aspect, the rotating case additionally has: a trunk part, through which the supporting member passes; a projection part, projecting from an inner surface of the trunk part, and maintaining a predetermined separation between the inner surface of the trunk part and an outer surface of space to the supporting case; a bracket-inserting opening, located on a first end of the rotating case to engage the mounting bracket. The mounting bracket additionally has an inserting part to engage the bracket-inserting opening.

According to one aspect, the rotating case additionally has an inserting guide, having an external diameter corresponding to an internal diameter of the rotating case and an internal diameter corresponding to an external diameter of the supporting case to aid insertion of the supporting case into the rotating case.

According to one aspect, the trunk part of the rotating case additionally has a wire holder.

According to one aspect, the trunk part of the rotating case has a stopper that projects farther from the inner face of the trunk part, than the projection part, and the outer surface of the supporting trunk part of the supporting case has a recess of predetermined size, to receive the stopper and limit a rotation of the rotating case about the supporting case.

According to one aspect, the stand also has a display-mounting part having a display base plate with a first engaging hole to engage a mounting face of the mounting bracket, and first and second side engaging parts, positioned on opposing sides of the display base plate, and a second engaging opening to engage the display.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
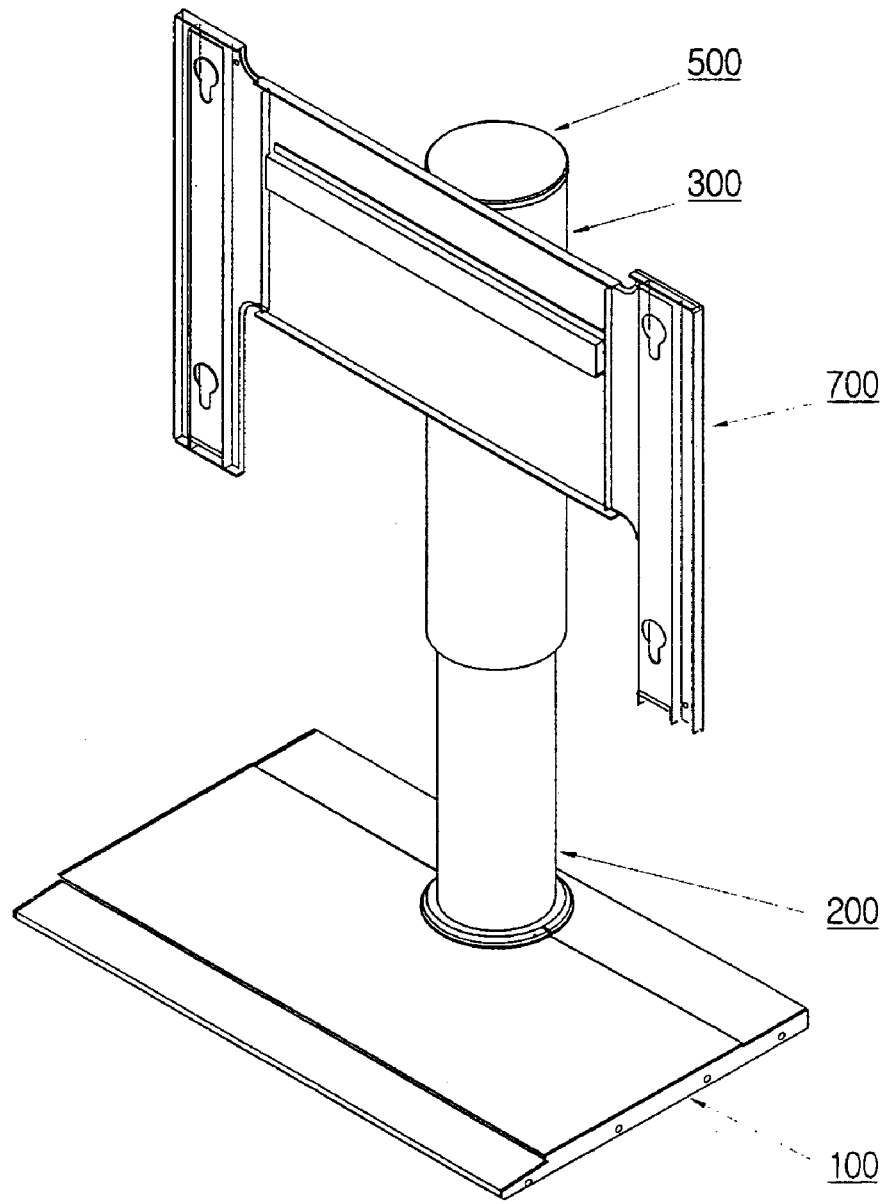
FIG. 1 is a combined perspective view of a stand according to the present invention.

Reference will now be made in detail to embodiments of the present invention, examples of which are illustrated in the accompanying drawings, wherein like reference numerals refer to like elements throughout. The embodiments are described below in order to explain the present invention by referring to the figures.

Figure 2:
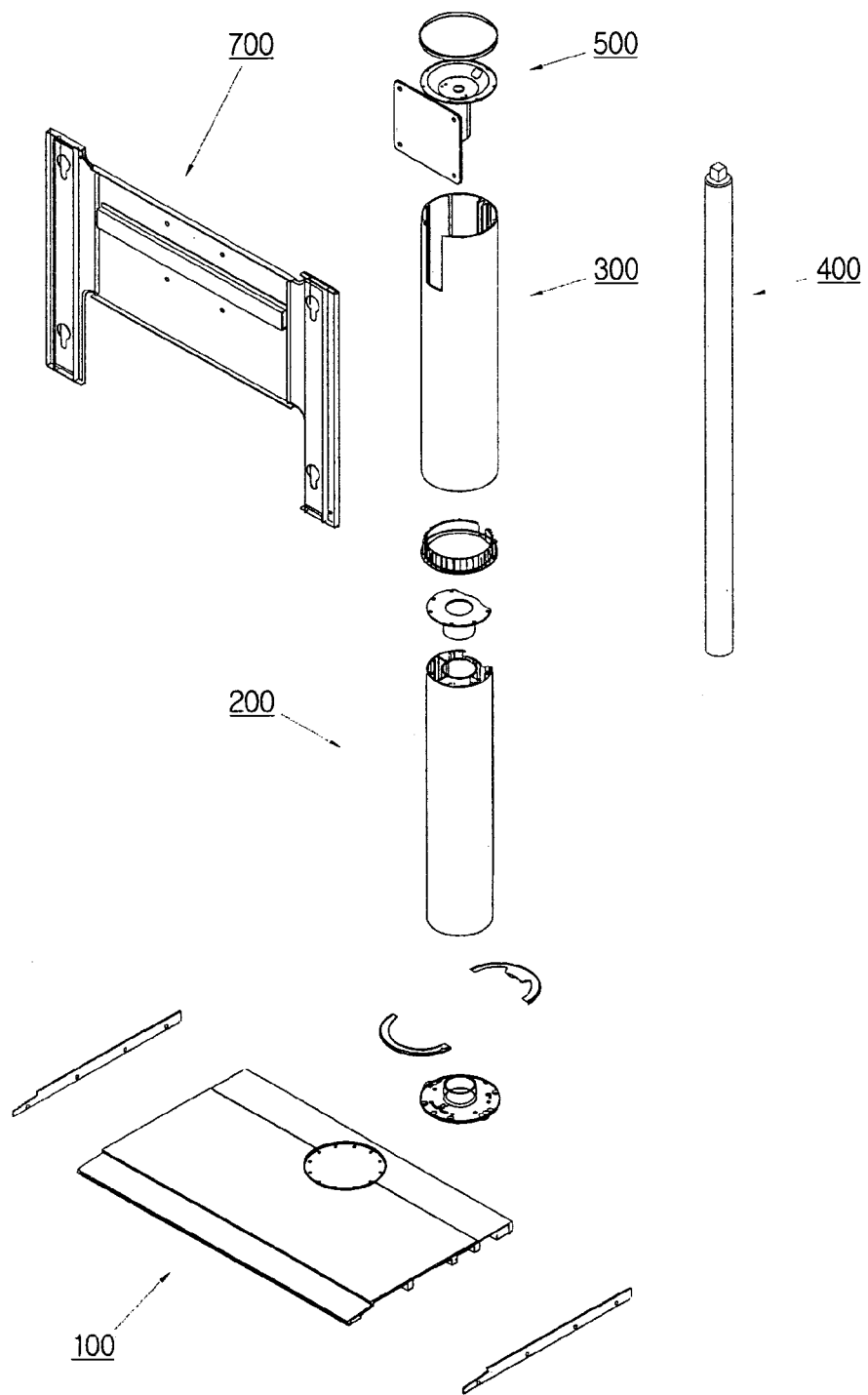
FIG. 2 is an exploded perspective view of the stand of FIG. 1.

A first embodiment of the stand includes a base 100, a supporting case 200, a supporting member 400 that can be swiveled, and an mounting bracket 500. As shown in FIGS. 1 and 2, a second embodiment of the stand includes a rotating case 300 in addition to the components of the first embodiment of the stand described above. According to a third embodiment, the stand includes a display-mounting part 700 in addition to the components of the second embodiment of the stand. The display-mounting part 700 mounts on the mounting bracket 500.

Further, substituting the cylinder part 600 (see FIG. 3G) for the supporting member 400 employed in the first, second, and third embodiments, creates respective fourth, fifth, and sixth embodiments. Detailed descriptions of each embodiment shall be made with reference to FIGS. 3A through 3G, respectively, which illustrate the components of the stand.

Figure 3A:
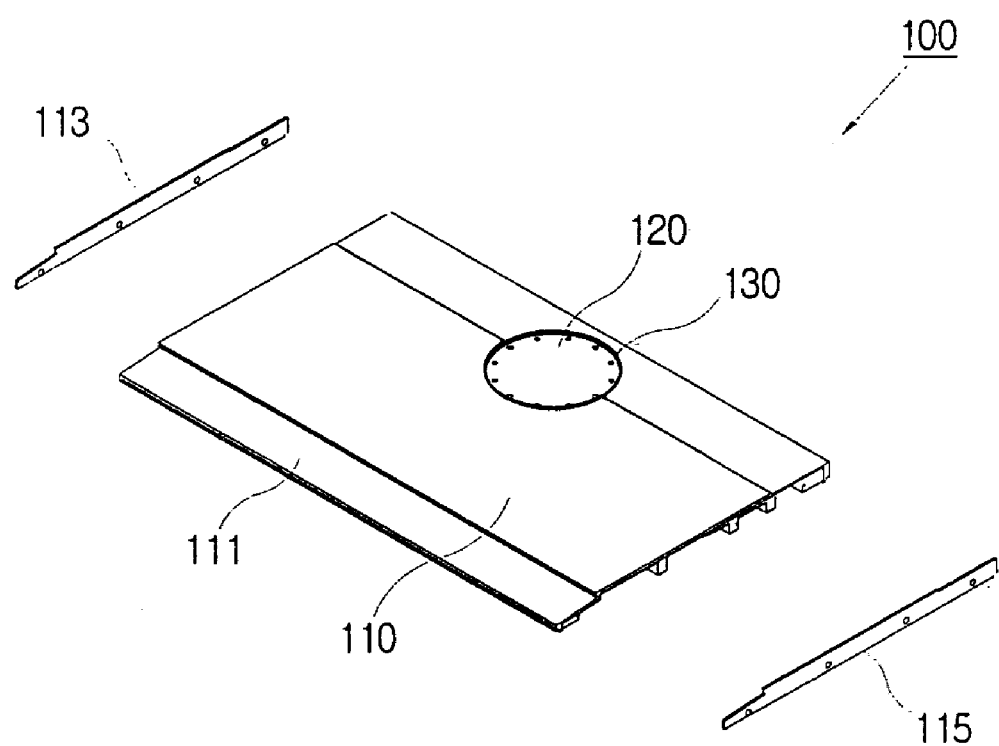
FIG. 3A is an exploded perspective view of a base 100 of the stand of FIG. 1.

FIG. 3A is an exploded perspective view of the base 100 of the stand according to the first embodiment of the present invention. The base 100 includes a base plate 110, a seating part 120, and an engaging hole 130.

An extending part 111 is located on a first end of the base plate 110 to widen a contact area of the base 100, and thereby enhance stability. According to another aspect, first and second sides of the base plate 110 are covered by a first cover 113 and a second cover 115 respectively.

The seating part 120 located at a predetermined position on the base plate 110 corresponds in shape to the supporting case 200. Along the edge of the seating part 120, there are a plurality of engaging holes 130 for seating the supporting case 200.

Figure 3B:
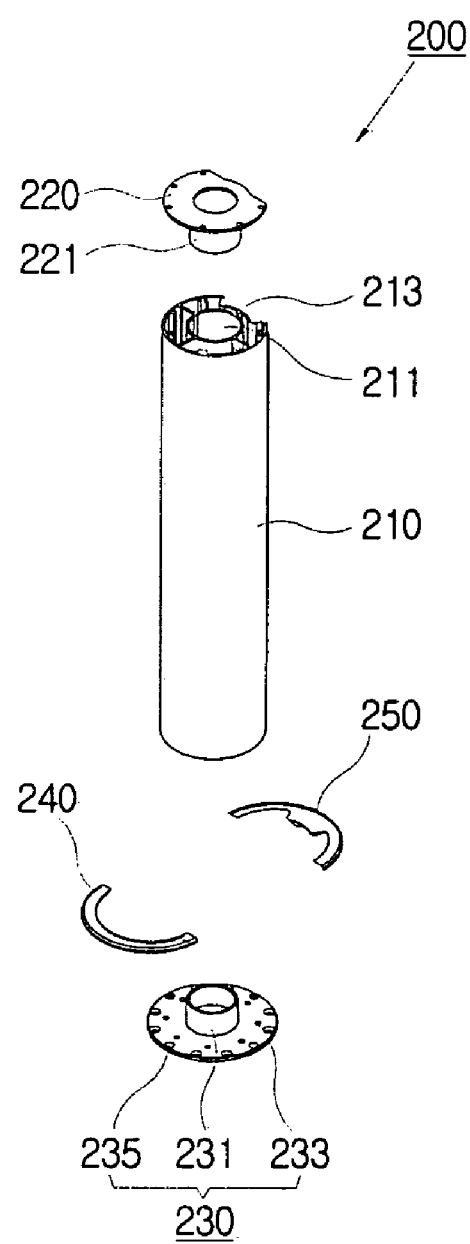
FIG. 3B is an exploded perspective view of a supporting case 200 of the stand of FIG. 1.

As shown in FIG. 3B. The supporting case 200 has a supporting trunk part 210 and a supporting guide 220. In the first embodiment, the supporting trunk part 210 may be circular or polygonal. However, in the second embodiment (to be described later), the rotating case 300 rotates, and thus the supporting trunk part 210 of the supporting case 200 corresponding thereto is approximately cylindrical.

According to one aspect, the supporting trunk part 210 has a penetrating pipe 211 through which the supporting member 400 passes. In the second and third embodiments, the supporting trunk part 210 additionally has a recess 213 accommodating a stopper 313 (see FIG. 3C) to limit rotation of the display.

The supporting guide 220 corresponds to the supporting trunk part 210, and has an opening through which the supporting member 400 passes. The supporting guide 220 guides the supporting member 400 to pass therethrough, and transfers the weight of the display from the supporting member 400 to the supporting case 200. According to one aspect, the supporting guide 220 has a bending part 221 extending from a guiding flange with an opening that corresponds to the opening formed in the supporting guide 220.

According to one aspect, the supporting case 200 has a supporting bracket 230, a first bracket cover 240, and a second bracket cover 250. The supporting bracket 230 facilitates mounting the supporting case 200 on the base 100, and has: a seating flange 231, in which the supporting member 400 is seated; a first engaging hole 233, engaging the supporting bracket 230 with the supporting trunk part 210; and a second engaging hole 235, engaging the supporting bracket 230 with the seating part 120 of the base 100. Specifically, the supporting bracket 230 engages the lower end of the supporting trunk part 210 of the supporting case 200 through the first engaging hole 233. Then, the supporting case 200 engages the base 100 through the second engaging holes 235 after the supporting bracket 230 is inserted into the seating part 120 of the base 100. Since a diameter of the supporting bracket 230 is larger than an external diameter of the supporting trunk part 210, a portion of the supporting bracket 230 is exposed. The exposed portion is covered by the first and second bracket covers 240 and 250.

Figure 3C:
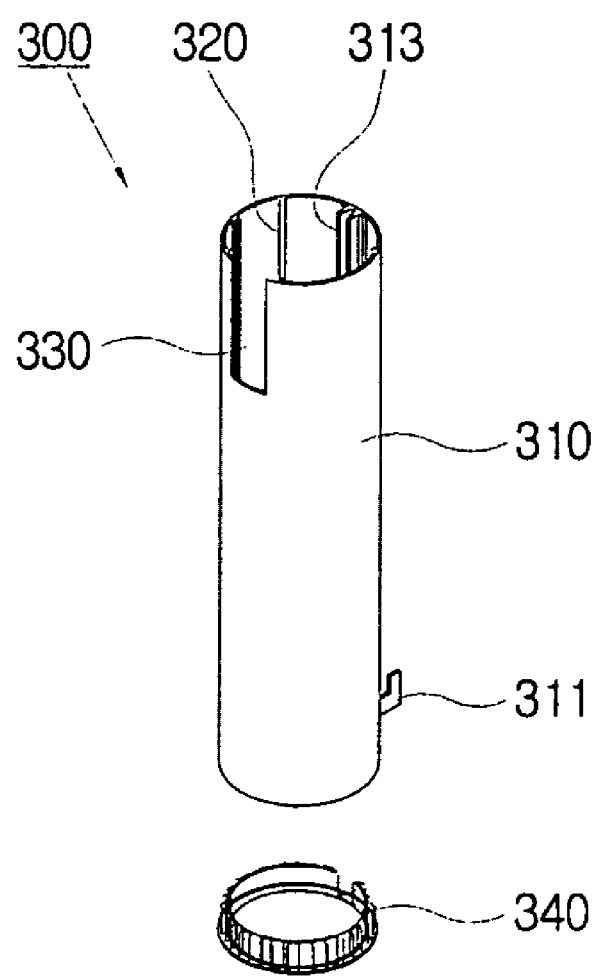
FIG. 3C is an exploded perspective view of an rotating case 300 of the stand according to a second embodiment of the present invention.

Referring to FIG. 3C, a trunk part 310 of the rotating case 300 has a hollow opening through which the supporting member 400 passes. The trunk part 310 is installed onto an upper part of the supporting case 200. Since the trunk part 310 rotates when installed on an upper part of the supporting case 200, according to one aspect, the trunk part 310 is approximately cylindrical.

A projection part 320 protrudes from an inner surface of the trunk part 310, and maintains a predetermined separation from an outer face of the supporting case 200. A bracket-inserting opening 330 is an opening located on the first end of the trunk part 310, and through which the rotating case 300 engages the mounting bracket 500.

According to one aspect, the rotating case 300 additionally has an inserting guide 340. The external diameter of the inserting guide 340 corresponds to an internal diameter of the trunk part 310, and the internal diameter of the inserting guide 340 corresponds to an external diameter of the supporting trunk part 210. Thus, the lower part of the trunk part 310 is inserted onto the upper part of the supporting trunk part 210.

According to another aspect, the trunk part 310 additionally has a wire holder 311. The wire holder 311 is a protrusion that holds a plurality of wires connected to the display.

According to another aspect, the trunk part 310 additionally has a stopper 313. The stopper 313 projects farther from an inner face of the trunk part 310, than the projection part 320. According to yet another aspect, the stopper 313 is molded from an elastic material. Also, according to still yet another aspect, the trunk part 310 is spaced from the supporting trunk part 210 to absorb an impact and facilitate a molding operation.

Figure 3D:
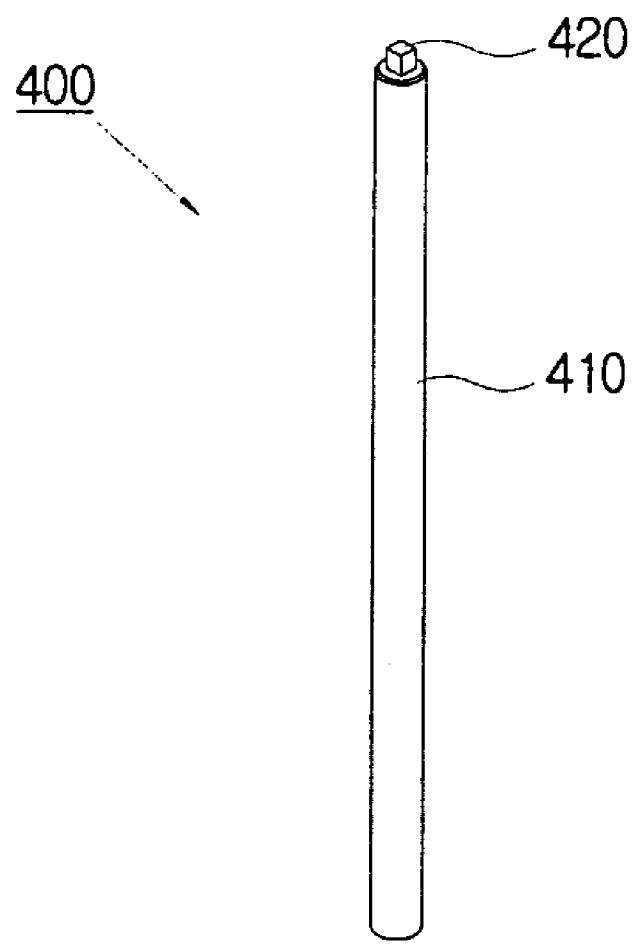
FIG. 3D is an exploded perspective view of a supporting member 400 of the stand of FIG. 1.

Referring to FIG. 3D, a supporting member 400 has a supporting shaft 410 and a bracket-engaging part 420. The bracket-engaging part 420 on a first end of the supporting shaft 410 engages an engaging part 510 of the mounting bracket 500 see FIG. 3E). Thus, the bracket engaging part 420 and the engaging part 510 have corresponding shapes. According to one aspect, the bracket engaging part 420 is polygonal and the engaging part 510 has a corresponding polygonal recess. It will be appreciated that the engaging part 510 may be polygonal, and the bracket engaging part 420 may have a corresponding polygonal recess.

Figure 3E:
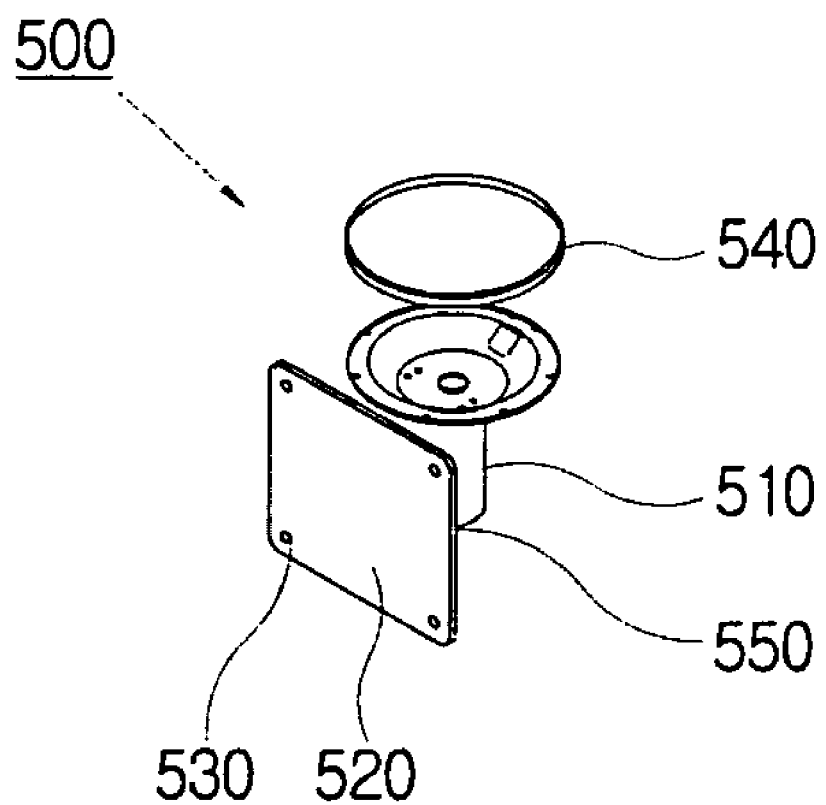
FIG. 3E is an exploded perspective view of an mounting bracket 500 of the stand of FIG. 1.

As shown in FIG. 3E the, mounting bracket 500 has an engaging part 510, a mounting face 520, and a mounted hole 530. As previously noted, engaging part 510 engages the bracket-engaging part 420 located on the first end of the supporting shaft 410 of the supporting member 400. According to one aspect, the mounting face 520 is shaped like a plate, with a face having the mounted hole 530 on which the display is mounted.

According to one aspect, the mounting bracket 500 additionally has a cover 540 and an inserting part 550. The cover 540 covers a first end of the mounting bracket 500 to conceal the inside thereof.

The inserting part 550 is needed in the second embodiment described above. The inserting part 550 is a boss of predetermined thickness that corresponds to the bracket-inserting opening 330 of the rotating case 300. The boss is positioned between the engaging part 510 and the mounting face 520, and extends away from the first end of the mounting bracket 500. The inserting part 550 is inserted into the bracket-inserting opening 330.

As previously mentioned, substituting the cylinder part 600 for the supporting member 400 employed in the first, second, and third embodiments, creates fourth, fifth, and sixth embodiments In the fourth, fifth, and sixth embodiments, the distance between the base and the display can be changed and the display can also be rotated.

Figure 3F:
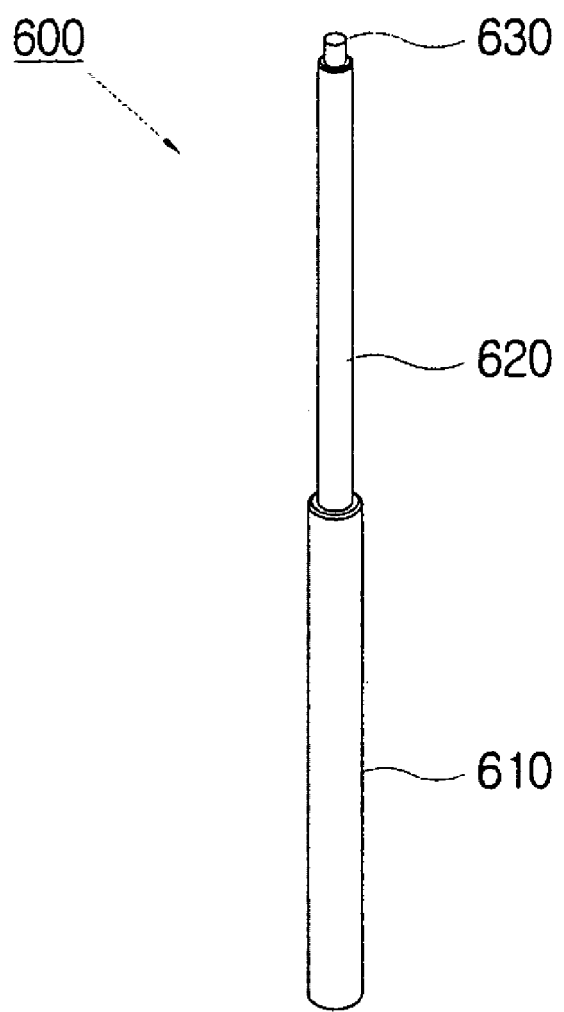
FIG. 3F is an exploded perspective view of a cylinder part 600 of the display according to fourth fifth, and sixth embodiments of the present invention.

Referring to FIG. 3F, cylinder part 600 has a cylinder cover 610, a cylinder 620 and a bracket-engaging part 630.

According to one aspect, cylinder 620 is a hydraulic cylinder filled with gas, such as air, and functions as a damping pot for translational movement of the cylinder part 600.

According to an aspect of the fourth embodiment, wherein the cylinder part 600 rotates, the bracket-engaging part 630 is polygonal. According to an aspect of the fifth and sixth embodiments, however, wherein the rotating case 300 rotates, the bracket-engaging part 630 is approximately cylindrical.

Figure 3G:
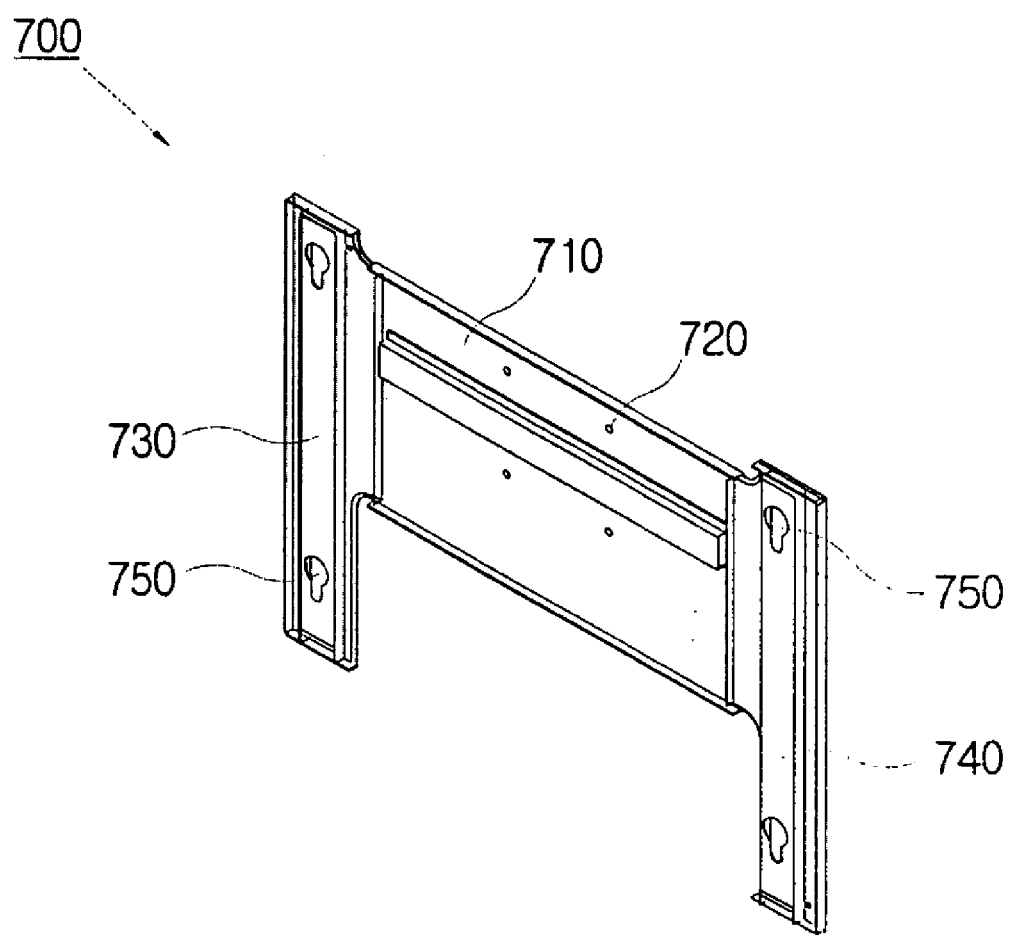
FIG. 3G is an exploded perspective view of a display-mounting part 700 of the stand according to a third embodiment of the present invention.

As shown in FIG. 3G, the display-mounting part 700 has a display base plate 710, a first engaging hole 720, a first engaging part 730, a second engaging part 740, and a second engaging hole 750.

According to the third and sixth embodiments, the display base plate 710 is shaped like a plate, and engages the mounting face 520 of the mounting bracket 500 through the first engaging hole 720 on the base plate 710 and the corresponding mounted hole 530. The first engaging part 730 and the second engaging part 740 are planar shaped wings located on opposite sides of the base plate 710, having the second engaging hole 750, through which the display is mounted to the display mounting part 700.

Figure 4:
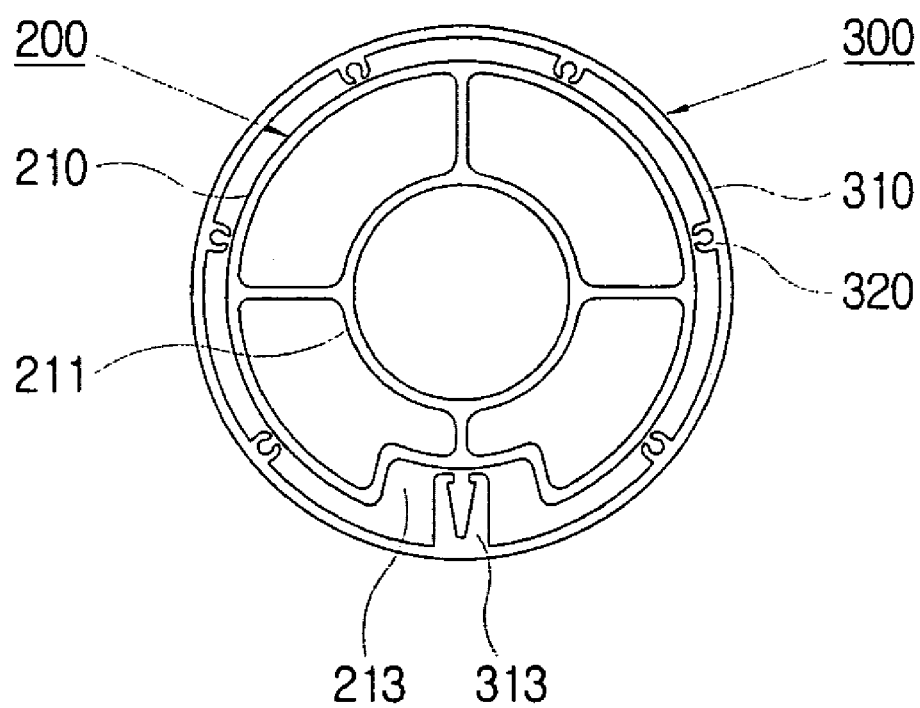
FIG. 4 is a sectional view showing a combination of the supporting case 200 and the rotating case 300 of the stand according to the second embodiment of the present invention.

As shown in FIG. 4, according to the second, third, fifth, and sixth embodiments of the invention the supporting case 200 is inserted into the rotating case 300.

The rotating case 300 maintains a predetermined separation from the inserted supporting case 200, owing to the projection part 320 of the trunk part 310. This separation and the projection part facilitate smooth rotation of the rotating case 300. The predetermined angle through which the rotating case 300 rotates, is limited by the stopper 313 and the recess 213 of the supporting trunk part 210.

It will be appreciated that the stopper 313 could be located on the external surface of the supporting case 200, and the corresponding recess 213 could be located on the interior surface of the upper case 300.

According to one aspect of the second, third, fifth, and sixth embodiments of the invention, the penetrating pipe 211, through which the cylinder part 600 passes, is located inside the supporting trunk part 210.

Thus, the stand, according to the present invention, is capable of swiveling and changing the distance between the base and the display, while supporting the weight of a large-sized display, and needing no separate device for swiveling and changing the elevation of the display.

To illustrate how the stand works, the following is a description of how the stand functions according to the sixth embodiment. A display is mounted to the display mounting part 700 using the second engaging hole 750. The display can be rotated by supplying a force of predetermined magnitude to a side of the display. Since the display mounting part 700 engages the mounting bracket 500, which in turn engages the cylinder part 600 and the rotating case 300, the force applied to the side of the display is transferred to the rotating case 300, and results in rotation about the axis of the cylinder part 600. This rotation continues until the stopper 313 encounters a side of the recess 213 (see FIG. 4). Similarly, rotation of the display can occur in the opposite direction until the stopper 313 encounters an opposing side of the recess 213.

The elevation of the display can be changed by applying a force of predetermined magnitude to a top or a bottom of the display. For purposes of this example, the force is applied to the top of the display. The force is transferred from the display to the display mounting part 700, and in turn to the mounting bracket 500 and the cylinder part 600, as described previously. The force compresses the cylinder part 600, sliding the cylinder 620 into the cylinder cover 610, and changing the elevation.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A stand for a display, comprising:
   a base;
   a supporting case mounted on the base;
   a supporting member having first and second ends, disposed inside the supporting case, the second end being rotatably seated on the base; and a mounting bracket, engaged with the first end of the supporting member, to engage the display, wherein the base comprises:
a base plate, and
a seating part having an engaging opening to engage the supporting case, wherein the base plate comprises:
an extending part, extending from the base plate, to increase stability of the base, and
a first cover and a second cover respectively disposed on opposite sides of the base plate.

2. The stand according to claim 1, wherein the supporting case comprises:
a supporting trunk part, that the supporting member passes through; and
a supporting guide, located at a first end of the supporting case, to guide the supporting member.

3. The stand according to claim 2, wherein the supporting case further comprises;
a supporting bracket, having
a seating flange, on which the second end of the supporting member is seated,
a first engaging opening, engaging the supporting trunk part of the supporting case, and
a second engaging opening engaging the seating part of the base; and
first and second bracket covers covering portions of the supporting bracket,
wherein the seating part of the base corresponds to the supporting bracket.

4. The stand according to claim 3, wherein the supporting trunk part of the supporting case further comprises:
a pipe, that the supporting member passes through, having an inner diameter corresponding to an outer diameter of the supporting member, to increase stability and load bearing capability of the stand.

5. The stand according to claim 2, wherein the supporting guide of the supporting case further comprises:
a bent part extending from a guiding flange having a central bore that guides the supporting member.

6. The stand for display according to claim 1, wherein the supporting member comprises:
a supporting shaft passing through the supporting case; and
a bracket-engaging part positioned on a first end of the supporting shaft, that engages the mounting bracket.

7. The stand according to claim 6, wherein the mounting bracket comprises:
an engaging part that engages the bracket-engaging part of the supporting member; and
a mounting face, having an opening on which to mount the display.

8. The stand according to claim 1, wherein the mounting bracket comprises:
a cover covering a first end of the mounting bracket.

9. The stand according to claim 1, wherein the supporting member comprises:
a cylinder cover;
a cylinder, combined with a first part of the cylinder cover, to translate along a common axis of the cylinder and cylinder cover; and
a bracket-engaging part, located at a first end of the cylinder, to engage the mounting bracket.

10. The stand according to claim 9, wherein the mounting bracket comprises:
an engaging part that engages the bracket engaging part of the supporting member; and
a mounting face, having an opening to mount the display.

11. The stand according to claim 10, wherein:
the bracket engaging part is polygonal; and
the engaging part has a polygonal recess to receive the bracket engaging part.

12. The stand according to claim 10, wherein:
the engaging part is polygonal; and
the bracket engaging part has a polygonal recess to receive the engaging part.

13. A stand for a display comprising:
a base;
a supporting case mounted on the base;
a supporting member having first and second ends, disposed inside the supporting case, the second end being seated on the base;
a rotating case, rotatably combined with a first end of the supporting case; and
amounting bracket, engaged with a first end of the rotating case, to engage the display, wherein the base comprises:
a base plate, and
a seating part having an engaging opening to engage the supporting case, wherein the base plate comprises:
an extending part, extending from the base plate, to increase stability of the base, and
a first cover and a second cover respectively disposed on opposite sides of the base plate.

14. The stand according to claim 13, wherein the supporting case comprises:
a supporting trunk part, that the supporting member passes through; and
a supporting guide, located at a first end of the supporting case, to guide the supporting member.

15. The stand according to claim 14, wherein the supporting case further comprises:
a supporting bracket, having
a seating flange, on which the second end of the supporting member is seated,
a first engaging opening, engaging the supporting trunk part of the supporting case, and
a second engaging opening engaging the seating part of the base; and
first and second bracket covers covering portions of the supporting bracket,
wherein the seating part of the base receives the supporting bracket.

16. The stand according to claim 15, wherein the supporting trunk part of the supporting case further comprises:
a pipe, that the supporting member passes through, having an inner diameter corresponding to an outer diameter of the supporting member, to increase stability and load bearing capability of the stand.

17. The stand according to claim 14, wherein the supporting guide of the supporting case further comprises:
a guiding flange having a central bore that guides the supporting member; and
a bent part extending from the guiding flange.

18. The stand for display according to claim 13, wherein the supporting member comprises:
a supporting shaft passing through the supporting case; and
a bracket-engaging part, positioned on a first end of the supporting shaft, that engages the mounting bracket.

19. The stand according to claim 18, wherein the mounting bracket comprises:
an engaging part that engages the bracket-engaging part of the supporting member; and
a mounting face having an opening to mount the display.

20. The stand according to claim 19, wherein:
the bracket engaging part is polygonal; and
the engaging part has a polygonal recess to receive the bracket engaging part.

21. The stand according to claim 19, wherein:
the engaging part is polygonal; and
the bracket engaging part has a polygonal recess to receive the engaging part.

22. The stand according to claim 19, further comprising:
a display-mounting part, having
 a display base plate with a first engaging opening to engage the mounting face of the mounting bracket, and
 first and second side engaging parts, positioned on opposing sides of the display base plate, and having a second engaging opening to engage the display.

23. The stand according to claim 22, wherein the supporting member comprises:
a cylinder cover;
a cylinder, combined with a first part of the cylinder cover to translate along a common axis of the cylinder and cylinder cover, and
a bracket-engaging part, located at a first end of the cylinder, to engage the mounting bracket.

24. The stand according to claim 23, wherein the mounting bracket comprises:
an engaging part that engages the bracket engaging part of the supporting member; and
a mounting face, having an opening to mount the display.

25. The stand according to claim 13, wherein the mounting bracket comprises:
a cover covering a first end of the mounting bracket.

26. The stand according to claim 13, wherein the rotating case further comprises:
a trunk part through which the supporting member and the supporting case pass,
a projection part, projecting from an inner surface of the trunk part, and maintaining a predetermined separation between the inner surface of the trunk part and an outer surface of the supporting case; and
a bracket-inserting opening, located on a first end of the rotating case to engage the mounting bracket,
wherein the mounting bracket further comprises an inserting part, to engage the bracket-inserting opening.

27. The stand according to claim 26, wherein the rotating case further comprises:
an inserting guide, having an external diameter corresponding to an internal diameter of the rotating case and an internal diameter corresponding to an external diameter of the supporting case.

28. The stand according to claim 26, wherein the trunk part of the rotating case further comprises:
a wire holder.

29. The stand according to claim 26, wherein:
the trunk part of the rotating case further comprises a stopper that projects from the inner surface of the trunk part; and
the outer surface of the supporting trunk part of the supporting case has a recess of predetermined size, to receive the stopper and limit a rotation of the rotating case about the supporting case.

30. The stand according to claim 29, wherein the stopper projects farther from the inner surface of the trunk part than the projection part.

31. The stand according to claim 26, wherein:
the outer surface of the supporting trunk part of the supporting case has a stopper that projects from the outer surface of the supporting trunk part; and
the trunk part of the rotating case further comprises a recess of predetermined size to receive the stopper and limit a rotation of the rotating case about the supporting case.

32. The stand according to claim 13, wherein the supporting member comprises:
a cylinder cover;
a cylinder, combined with a first part of the cylinder cover, to translate along a common axis of the cylinder and cylinder cover; and
a bracket-engaging part, located at a first end of the cylinder, to engage the mounting bracket.

33. The stand according to claim 32, wherein the mounting bracket comprises:
an engaging part that engages the bracket engaging part of the supporting member; and
a mounting face, having an opening to mount the display.

34. A stand for a display comprising:
a base;
a supporting member having first and second ends, rotatably engaged with the base at the second end of the supporting member; and
a mounting bracket, engaged with the first end of the supporting member, to engage the display, wherein the base comprises:
a base plate, and
a seating part having an engaging opening to engage the supporting member, wherein the base plate comprises:
an extending part, extending from the base plate, to increase stability of the base, and
a first cover and a second cover respectively disposed on opposite sides of the base plate and opposite sides of the extending part.

35. The stand according to claim 34, wherein:
the supporting member compresses and extends along an axis perpendicular to the base.

36. The stand according to claim 35, wherein the supporting member further comprises:
a damping pot to regulate extension and compression of the supporting member.

37. A stand for a display comprising:
a base;
a supporting member having first and second ends, engaged with the base at the second end of the supporting member;
a rotating case, rotatably engaged with the supporting member; and
a mounting bracket, engaged with a first end of the rotating case, to engage the display, wherein the base comprises:
a base plate, and
a seating part having an engaging opening to engage the supporting member, wherein the base plate comprises:
an extending part, extending from the base plate, to increase stability of the base; and
a first cover and a second cover respectively disposed on opposite sides of the base plate.

38. The stand according to claim 37, further comprising:
a display mounting part, engaged with the mounting bracket, to engage the display.

39. The stand according to claim 38, wherein:
the supporting member compresses and extends along an axis perpendicular to the base.

40. The stand according to claim 39, wherein the supporting member further comprises:
a damping pot to regulate extension and compression of the supporting member.

41. The stand according to claim 37, wherein:
the supporting member compresses and extends along an axis perpendicular to the base.

42. The stand according to claim 41, wherein the supporting member further comprises:
a damping pot to regulate extension and compression of the supporting member.

43. A stand for a display, comprising:
a base;
a supporting case mounted to the base;
a cylinder part having first and second ends, disposed inside the supporting case, the second end being seated on the base, and having an axis that is perpendicular to the base;
a rotating case that engages the second end of the cylinder part, wherein the rotating case slides over at least a portion of the supporting case;
a mounting bracket that engages the second end of the cylinder part, and engages the rotating case; and
a display mounting part, on which the display is mounted, that engages the mounting bracket,
wherein when a force of predetermined magnitude is applied to a side of the display, the force is serially transferred from the display to the display mounting part, the mounting bracket, and the rotating case, resulting in rotation of the rotating case about the axis of the cylinder part, wherein the base comprises:
a base plate, and
a seating part having an engaging opening to engage the supporting case, wherein the base plate comprises:
an extending part, extending from the base plate, to increase stability of the base, and
a first cover and a second cover respectively disposed on opposite sides of the base plate.

44. The stand according to claim 43, wherein:
the cylinder part compresses and extends along the axis of the cylinder part; and
within a predetermined range of elevations,
when a force is applied to a top of the display, the force is serially transferred from the display to the display mounting part, the mounting bracket, and the cylinder part, resulting in compression of the cylinder part and a decrease of an elevation of the display, and
when a force is applied to a bottom of the display, the force is transferred from the display to the display mounting part, to the mounting bracket, to the cylinder part, resulting in extension of the cylinder part and an increase of the elevation of the display.

* * * * *

UNITED STATES PATENT AND TRADEMARK OFFICE
CERTIFICATE OF CORRECTION

| | | |
|---|---|---|
| PATENT NO. | : 7,195,214 B2 | Page 1 of 1 |
| APPLICATION NO. | : 10/694041 | |
| DATED | : March 27, 2007 | |
| INVENTOR(S) | : You-sub Lee et al. | |

It is certified that error appears in the above-identified patent and that said Letters Patent is hereby corrected as shown below:

On The Title page Item (57) (Abstract), Line 5, after "with the" delete "the" (Second Occurrence).

Column 9, Line 22, change "cover," to --cover;--.

Signed and Sealed this

Twenty-third Day of October, 2007

JON W. DUDAS
*Director of the United States Patent and Trademark Office*